US012700586B2

(12) United States Patent
  Zhao et al.

(10) Patent No.: US 12,700,586 B2
(45) Date of Patent: Aug. 4, 2026

(54) NEGATIVE ELECTRODE ACTIVE MATERIAL AND PREPARATION METHOD THEREOF, AS WELL AS SECONDARY BATTERY HAVING THE SAME

(71) Applicant: CONTEMPORARY AMPEREX TECHNOLOGY (HONG KONG) LIMITED, Hong Kong (CN)

(72) Inventors: Yuzhen Zhao, Ningde City (CN); Yingjie Guan, Ningde City (CN); Qingyan Ma, Ningde City (CN); Yan Wen, Ningde City (CN); Qisen Huang, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 287 days.

(21) Appl. No.: 18/459,375

(22) Filed: Aug. 31, 2023

(65) Prior Publication Data

US 2023/0420661 A1     Dec. 28, 2023

Related U.S. Application Data

(63) Continuation of application No. PCT/CN2022/094760, filed on May 24, 2022.

(30) Foreign Application Priority Data

Sep. 28, 2021    (CN) .......................... 202111143669.2

(51) Int. Cl.
  *H01M 4/36* (2006.01)
  *H01M 4/04* (2006.01)
  (Continued)

(52) U.S. Cl.
  CPC ......... *H01M 4/366* (2013.01); *H01M 4/0471* (2013.01); *H01M 4/386* (2013.01);
  (Continued)

(58) Field of Classification Search
  None
  See application file for complete search history.

(56) References Cited

U.S. PATENT DOCUMENTS

2010/0015509 A1     1/2010   Inagaki et al.
2015/0364794 A1*   12/2015   Nakazawa ............ H01M 4/583
                                                            429/188
(Continued)

FOREIGN PATENT DOCUMENTS

CN          103618071 A       3/2014
CN          104157855 A      11/2014
          (Continued)

OTHER PUBLICATIONS

The international search report received in the corresponding international application PCT/CN2022/094760, mailed Aug. 8, 2022.
(Continued)

*Primary Examiner* — Zhongqing Wei
(74) *Attorney, Agent, or Firm* — K&L Gates LLP

(57)          ABSTRACT

Provided are a negative electrode active material and a preparation method thereof, as well as a secondary battery having the same, and a battery module, a battery pack and an electrical apparatus. The negative electrode active material of the present application comprises: a silicon inner core; a first cladding layer clad on the surface of the silicon inner core, wherein the first cladding layer is a carbon-containing layer; and a second cladding layer clad on the surface of the first cladding layer, wherein the second cladding layer is an elemental sulfur layer. By using the negative electrode active material of the present application,
(Continued)

the energy density of the secondary battery can be improved, and the cycle life can be prolonged.

15 Claims, 3 Drawing Sheets

(51) Int. Cl.

| | | |
|---|---|---|
| *H01M 4/38* | (2006.01) | |
| *H01M 4/583* | (2010.01) | |
| *H01M 10/0569* | (2010.01) | |
| *H01M 4/02* | (2006.01) | |

(52) U.S. Cl.
CPC ....... *H01M 4/583* (2013.01); *H01M 10/0569* (2013.01); *H01M 2004/027* (2013.01); *H01M 2300/0034* (2013.01); *H01M 2300/0051* (2013.01)

(56) References Cited

U.S. PATENT DOCUMENTS

| | | | |
|---|---|---|---|
| 2016/0006024 A1* | 1/2016 | Xiao | ................... H01M 4/0402 |
| | | | 429/231.1 |
| 2019/0207221 A1* | 7/2019 | Son | ..................... H01M 4/1395 |
| 2021/0020940 A1 | 1/2021 | Lee et al. | |

FOREIGN PATENT DOCUMENTS

| | | | |
|---|---|---|---|
| CN | 108110228 | A | 6/2018 |
| CN | 108400294 | A | 8/2018 |
| CN | 108511719 | A | 9/2018 |
| CN | 109950481 | A | 6/2019 |
| CN | 110085846 | A | 8/2019 |
| CN | 111540889 | A | 8/2020 |
| CN | 112310352 | A | 2/2021 |
| CN | 112310359 | A | 2/2021 |
| CN | 112366301 | A | 2/2021 |
| JP | 2013161597 | A | 8/2013 |
| JP | 2022524444 | A | 5/2022 |
| JP | 2022524786 | A | 5/2022 |
| KR | 1020190083613 | A | 7/2019 |
| WO | 2021017827 | A1 | 2/2021 |
| WO | 2021017956 | A1 | 2/2021 |

OTHER PUBLICATIONS

The extended European search report received in the counterpart European application 22874235.9, mailed on Jan. 29, 2025.

The first office action received in the corresponding Chinese application 202111143669.2, mailed on Jun. 4, 2023.

Notice of Reasons for Refusal in the corresponding Japanese application 2023-530788, mailed on Jun. 6, 2024.

The Request for the Submission of an Opinion received in the counterpart KR application 10-2023-7016641, dated May 2, 2025, 23 pages with English translation.

The Notice of Reasons for Refusal received in the counterpart Japanese application 2023-530788, mailed on Dec. 3, 2024.

The Notice of Reexamination received in the counterpart Chinese application 202111143669.2, mailed on Jun. 28, 2024.

Chengwei Xiao et al, "Electric Vehicle Engineering Manual vol. 4 Vehicle Power Battery", Machinery Industry Press, 2019.11, p. 597.

Yiyong Zhang et al, "Principle of lithium sulfur battery and design and construction of positive electrode", Metallurgical industry press, Apr. 2020, p. 45.

* cited by examiner

5

5

NEGATIVE ELECTRODE ACTIVE MATERIAL AND PREPARATION METHOD THEREOF, AS WELL AS SECONDARY BATTERY HAVING THE SAME

CROSS-REFERENCE TO RELATED APPLICATIONS

The present application is a continuation of International Application PCT/CN2022/094760, filed on May 24, 2022, which claims priority to Chinese patent application 202111143669.2 entitled "NEGATIVE ELECTRODE ACTIVE MATERIAL AND PREPARATION METHOD THEREOF, AS WELL AS SECONDARY BATTERY HAVING THE SAME" and filed on Sep. 28, 2021, the entire contents of which are incorporated herein by reference.

TECHNICAL FIELD

The present application relates to the technical field of batteries, and in particular to a negative electrode active material and a preparation method thereof, as well as a secondary battery having the same, and a battery module, a battery pack and an electrical apparatus.

BACKGROUND ART

Secondary batteries have the advantages of reliable working performance, no pollution, memoryless effect, etc., so they are widely used. For example, with the increasing attention to environmental protection issues and the increasing popularity of new energy vehicles, the demand for power secondary batteries will show explosive growth. However, with the increasingly wide application of secondary batteries, the performance of secondary batteries is also facing severe challenges.

The development of negative electrode materials with excellent performance is the key to improving the performance of secondary batteries, and among the many negative electrode materials currently developed, silicon negative electrode active materials are very suitable for the preparation of high-performance secondary batteries because of their high theoretical specific capacity. However, the existing silicon negative electrode active materials still need to be improved.

SUMMARY OF THE INVENTION

The present application has been made in view of the above-mentioned issues, and an objective thereof is to provide a negative electrode active material and a preparation method thereof, as well a secondary battery having the same, and a battery module, a battery pack and an electrical apparatus, wherein the negative electrode active material can increase the energy density and prolong the cycle life.

In order to achieve the above objective, a first aspect of the present application is to provide a negative electrode active material, which comprises: a silicon inner core; a first cladding layer clad on the surface of the silicon inner core, wherein the first cladding layer is a carbon-containing layer; and a second cladding layer clad on the surface of the first cladding layer, wherein the second cladding layer is an elemental sulfur layer.

By disposing a carbon-containing layer as the first cladding layer on the silicon inner core, and further disposing an elemental sulfur layer as the second cladding layer on the first cladding layer, the negative electrode active material thus obtained can increase the energy density and prolong the cycle life.

In some embodiments, the sulfur content in the second cladding layer is 0.1 mass % to 4 mass % based on the total mass of the negative electrode active material. The outermost layer of the negative electrode active material is clad with elemental sulfur, and by keeping the elemental sulfur content within this range, the ion-conducting performance is further improved, the interface impedance is reduced, and the cycling performance is improved.

In some embodiments, the carbon content in the first cladding layer is 0.4 mass % to 6 mass % based on the total mass of the negative electrode active material. The carbon cladding layer can improve the conductivity of the silicon material, and by keeping the carbon content within the above range, the battery impedance can be further reduced and the cycling performance of the secondary battery can be improved.

In some embodiments, the mass ratio of carbon content to sulfur content (carbon content/sulfur content) is 0.33 to 23 based on the total mass of the negative electrode active material. By further setting the mass ratio of carbon content to sulfur content within this range, the effect of improving the cycling performance of the battery can be effectively exerted.

In some embodiments, the mass ratio of sulfur content to silicon inner core content (sulfur content/silicon inner core content) is 0.1% to 4.27% based on the total mass of the negative electrode active material. By further setting the mass ratio of sulfur content to silicon inner core content within this range, the effect of improving the cycling performance of the battery can be effectively exerted.

In some embodiments, the mass ratio of silicon inner core content to carbon content (silicon inner core content/carbon content) is 15.47 to 246 based on the total mass of the negative electrode active material. By further setting the mass ratio of silicon inner core content to carbon content within this range, the effect of improving the cycling performance of the battery can be effectively exerted.

In some embodiments, the silicon inner core is selected from one or more of elemental silicon, silicon alloys, and silicon oxides. By further setting the silicon inner core material, the effect of improving the cycling performance of the battery can be effectively exerted.

In some embodiments, the silicon alloy is selected from one or more of ferrosilicon alloys, silicon-aluminum alloys, silicomanganese alloys, silicon-tin alloys, and silicon-germanium alloys.

In some embodiments, the carbon source material of the first cladding layer is selected from one or more of glucose, cellulose, sucrose, starch, phenolic resin, polyacrylonitrile, polyimide, polyvinylidene fluoride, carbon black, carbon nanotubes and graphene. By further setting the carbon source material, the effect of improving the cycling performance of the battery can be effectively exerted.

In some embodiments, the second cladding layer has a cladding rate of 70% to 100%. By further setting the cladding rate of the second cladding layer, the effect of improving the cycling performance of the battery can be effectively exerted.

In some embodiments, the second cladding layer has a thickness of 4 nm to 70 nm, the first cladding layer has a thickness of 5 nm to 120 nm, and the negative electrode active material has a particle size of 0.5 μm to 8 μm. By further setting the thickness of the second cladding layer, the thickness of the first cladding layer, and the particle size of the negative electrode active material, the effect of improving the cycling performance of the battery can be effectively exerted.

A second aspect of the present application provides a preparation method of the negative electrode active material according to the first aspect of the present application, which comprises the following steps (1) to (4) or (a) to (c).

Among them, the steps (1) to (4) are:

step (1): dissolving a carbon source material as a first cladding layer in a solvent to obtain a solution;

step (2): adding a silicon inner core material to the solution obtained in the above step (1), and evaporating the mixture to dryness while stirring to obtain a powder;

step (3): heating the powder obtained in the step (2) to 700° C. to 1100° C. under vacuum inert gas conditions, sintering and holding it at this temperature, and then slowly cooling it down to room temperature to obtain a silicon inner core clad with a first cladding layer on the surface;

step (4): well mixing the silicon inner core clad with the first cladding layer on the surface obtained in the step (3) and an elemental sulfur material as a second cladding layer, heating the mixture to 200° C. to 350° C. under vacuum conditions, sintering and holding it at this temperature, and then slowly cooling it down to room temperature to obtain the negative electrode active material.

The steps (a) to (c) are:

step (a): dispersing a carbon source material as a first cladding layer in a solvent to obtain a dispersion;

step (b): adding a silicon inner core material to the dispersion obtained in the above step (a), and stirring and drying the mixture to obtain a silicon inner core clad with a first cladding layer on the surface;

step (c): well mixing the silicon inner core clad with the first cladding layer on the surface obtained in the step (b) and an elemental sulfur material as a second cladding layer, heating the mixture to 200° C. to 350° C. under vacuum conditions, sintering and holding it at this temperature, and then slowly cooling it down to room temperature to obtain the negative electrode active material.

In some embodiments, the heating rate in the step (3) is 1° C./min to 5° C./min.

In some embodiments, the heating rate in the step (4) or the step (c) is 1° C./min to 5° C./min.

In some embodiments, the holding time in the step (3) is 3 h to 6 h.

In some embodiments, the holding time in the step (4) or the step (c) is 2.5 h to 7 h.

A third aspect of the present application is to provide a secondary battery comprising the negative electrode active material according to the first aspect of the present application and an electrolyte solution.

In some embodiments, the electrolyte solution contains fluoroethylene carbonate and/or vinylene carbonate as additives, so as to improve the protection effect on the surface of the negative electrode material and improve the rate and the cycling performance.

In some embodiments, in the electrolyte solution, the content of the fluoroethylene carbonate and/or the vinylene carbonate is 0.5 mass % to 13 mass % in terms of mass percentage. By further setting the content of the fluoroethylene carbonate and/or the vinylene carbonate, the effect of improving the cycling performance of the battery can be effectively exerted.

In some embodiments, when the electrolyte solution contains fluoroethylene carbonate and vinylene carbonate, in the electrolyte solution, the mass ratio of the content of the fluoroethylene carbonate to the content of the vinylene carbonate (content of fluoroethylene carbonate/content of vinylene carbonate) is 0.3 to 5.5. By further setting the mass ratio of the content of the fluoroethylene carbonate to the content of the vinylene carbonate, the effect of improving the cycling performance of the battery can be effectively exerted.

In some embodiments, the mass ratio of the content of fluoroethylene carbonate and/or vinylene carbonate in the electrolyte solution to the content of elemental sulfur in the negative electrode active material (content of fluoroethylene carbonate and/or vinylene carbonate in the electrolyte solution/content of elemental sulfur in the negative electrode active material) is 0.42 to 60. By further setting the mass ratio of the content of fluoroethylene carbonate and/or vinylene carbonate to the content of elemental sulfur in the negative electrode active material, the effect of improving the cycling performance of the battery can be effectively exerted.

A fourth aspect of the present application provides a battery module comprising the secondary battery according to the third aspect of the present application.

A fifth aspect of the present application provides a battery pack comprising the battery module according to the fourth aspect of the present application.

A sixth aspect of the present application provides an electrical apparatus comprising at least one of the secondary battery according to the third aspect of the present application, the battery module according to the fourth aspect of the present application, and the battery pack according to the fifth aspect of the present application.

According to the present application, the energy density of the secondary battery is improved, and the cycle life is prolonged.

DESCRIPTION OF REFERENCE NUMERALS

Figure 1:
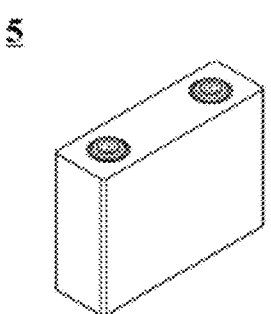
FIG. 1 is a schematic view of a secondary battery according to an embodiment of the present application.

1 battery pack; 2 upper box; 3 lower box; 4 battery module; 5 secondary battery; 51 case; 52 electrode assembly; 53 top cover assembly

DETAILED DESCRIPTION

The present application is further described below in combination with specific examples. It should be understood that these specific examples are only used to illustrate the present application and not to limit the scope of the present application. Hereinafter, embodiments that specifically disclose a negative electrode active material and a preparation method thereof, as well as a negative electrode sheet, a secondary battery, a battery module, a battery pack, and an electrical apparatus of the present application will be described in detail with reference to the drawings as appropriate. However, there are cases where unnecessary detailed descriptions are omitted. For example, there are cases where detailed descriptions of well-known items and repeated descriptions of actually identical structures are omitted. This is to avoid unnecessary redundancy in the following descriptions and to facilitate the understanding by those skilled in the art. In addition, the drawings and subsequent descriptions are provided for those skilled in the art to fully understand the present application, and are not intended to limit the subject matter recited in the claims.

The "range" disclosed in the present application is defined in terms of lower and upper limits, and a given range is defined by selecting a lower limit and an upper limit, which define the boundaries of a particular range. A range defined in this manner may be inclusive or exclusive of end values, and may be arbitrarily combined, that is, any lower limit may be combined with any upper limit to form a range. For example, if ranges of 60 to 120 and 80 to 110 are listed for a particular parameter, it is understood that ranges of 60 to 110 and 80 to 120 are also expected. In addition, if the minimum range values listed are 1 and 2, and if the maximum range values listed are 3, 4 and 5, the following ranges are all expected: 1 to 3, 1 to 4, 1 to 5, 2 to 3, 2 to 4 and 2 to 5.

In the present application, unless otherwise stated, a numerical range "a to b" represents an abbreviated representation of any combination of real numbers between a and b, wherein a and b are both real numbers. For example, the numerical range "0 to 5" indicates that all real numbers between "0 and 5" have been listed herein, and "0 to 5" is only an abbreviated representation of a combination of these numerical values. Additionally, when it is stated that a certain parameter is an integer of ≥2, it is equivalent to disclosing that the parameter is, for example, an integer of 2, 3, 4, 5, 6, 7, 8, 9, 10, 11, 12, etc.

Unless otherwise specified, all embodiments and optional embodiments of the present application may be combined with each other to form new technical solutions.

Unless otherwise specified, all technical features and optional technical features of the present application may be combined with each other to form new technical solutions.

Unless otherwise specified, the terms "comprise", "comprising", "include" and "including" mentioned in the present application may be open-ended or closed-ended. For example, the "including" and "comprising" may indicate that it is possible to include or comprise other components not listed, and it is also possible to include or comprise only the listed components.

Unless otherwise specified, the term "or" is inclusive in the present application. By way of example, the phrase "A or B" means "A, B, or both A and B". More specifically, the condition "A or B" is satisfied by any of the following: A is true (or present) and B is false (or absent); A is false (or absent) and B is true (or present); or both A and B are true (or present).

Negative Electrode Active Material

In an embodiment of the present invention, the present application provides a negative electrode active material, which comprises: a silicon inner core; a first cladding layer clad on the surface of the silicon inner core, wherein the first cladding layer is a carbon-containing layer; and a second cladding layer clad on the surface of the first cladding layer, wherein the second cladding layer is an elemental sulfur layer.

The silicon inner core can be alloyed with lithium at room temperature to form $Li_{1.5}Si_4$ phase, with a theoretical specific capacity of up to 3572 mA·h/g, which is much higher than the theoretical specific capacity of commercial graphite (372 mA·h/g). Silicon is abundant in reserves in the earth's crust elements (26.4%, ranking second), low in cost and environmentally friendly. Therefore, silicon negative electrode materials have been attracting attention.

However, there is a serious volume expansion (about 300%) in the silicon inner core in the charging and discharging process. The huge volume effect and low conductivity limit its application. In order to overcome these defects, the inventors have made a lot of attempts, using composite technology to compensate for material expansion.

Although the mechanism is not clear, the inventors unexpectedly found that by designing the Si/C/S composite system, the Si inner core is used as the active material to provide lithium storage capacity; the C layer can not only buffer the volume change of Si negative electrode during the charging and discharging process, but also improve the conductivity of Si materials, and avoid the agglomeration of Si particles in the charge-discharge cycle; S element reacts with lithium ions to form polysulfides, which in turn undergo nucleophilic reactions with vinylene carbonate and/or fluoroethylene carbonate in the electrolyte solution to form an artificial SEI film on the surface of silicon particles. Therefore, the negative electrode active material of the Si/C/S composite system combines the advantages of the three, showing high specific capacity and long cycle life.

Specifically, for the Si/C/S composite system of the present application, the silicon inner core is used as the core, the carbon-containing layer as the first cladding layer is clad on the outer surface of the silicon inner core, and the elemental sulfur layer as the second cladding layer is further clad on the first cladding layer, thereby obtaining the negative electrode active material with a cladding structure as the Si/C/S composite system. When the negative electrode active material of the present application is intercalated with lithium for the first time, the elemental sulfur clad on the outermost surface thereof will react with lithium ions to form polysulfides, and the sulfur in the polysulfides has strong nucleophilicity and will undergo a nucleophilic reaction with vinylene carbonate and/or fluoroethylene carbonate as additives in the electrolyte solution to form an artificial SEI film on the surface of silicon particles in situ to protect the surface of silicon particles and prevent the electrolyte solution from damaging the negative electrode active material, thereby increasing the energy density and prolonging the cycle life.

It can determine, through transmission electron microscope (TEM) images, whether the negative electrode active material of the present application forms a first cladding layer on the surface of the silicon inner core, and then forms a second cladding layer on the surface of the first cladding layer, as well as the following performance parameters such as the thickness of the first cladding layer, the thickness and cladding rate of the second cladding layer, and the particle size of the negative electrode active material. As an example, the following steps can be followed: selecting a micro-grid with a certain diameter, clamping the edge of the micro-grid with pointed tweezers, and turning its film side up (the film side is the side that shows gloss when observing under the light), gently laying the micro-grid flat on white filter paper; taking an appropriate amount of the negative electrode active material sample and adding it to a beaker filled with an appropriate amount of ethanol for ultrasonic oscillation; absorbing the sample with a glass capillary, and then adding 2-3 drops of the sample to be tested on the micro-grid; after oven baking, placing the micro-grid with the sample to be tested on a sample stage to test using a transmission electron microscope at a certain magnification, thereby obtaining the transmission electron microscope (TEM) image of the sample to be tested. The structure, performance parameters, etc. of the negative electrode active material of the present application can be judged from the TEM image.

In some embodiments, the sulfur content in the second cladding layer is 0.1 mass % to 4 mass % based on the total mass of the negative electrode active material. In some embodiments, the elemental sulfur content in the second cladding layer may be within the numerical range formed by any two of the following numerical values as the end values: 0.1 mass %, 0.5 mass %, 1.2 mass %, 2.0 mass %, 3.0 mass %, and 4.0 mass %. The outermost layer of the negative electrode active material is clad with elemental sulfur, and by keeping the elemental sulfur content within this range, an artificial SEI film can be formed in situ when the silicon material is intercalated with lithium for the first time, which further improves the ion-conducting performance, reduces the interface impedance, and improves the cycling performance. If the elemental sulfur content is too high and outside the above range, the generated polysulfides will not react completely, and the residual polysulfides will have a shuttle effect, thereby deteriorating the cycling performance of the battery cell; if the elemental sulfur content is too low and outside the above range, the artificial SEI film formed in situ is not dense and firm enough, so the ideal improvement effect can not be achieved.

In some embodiments, the carbon content in the first cladding layer is 0.4 mass % to 6 mass % based on the total mass of the negative electrode active material. In some embodiments, the elemental carbon content in the first cladding layer may be within the numerical range formed by any two of the following numerical values as the end values: 0.4 mass %, 1.1 mass %, 2.3 mass %, 3.2 mass %, 4.0 mass %, 4.9 mass %, and 6 mass %. The carbon cladding layer can improve the conductivity of the silicon material, and by keeping the carbon content within the above range, the battery impedance can be further reduced and the cycling performance of the secondary battery can be improved. If the carbon content is too high and outside the above range, the gram capacity of the negative electrode material will be reduced, affecting the energy density of the battery; if the carbon content is too low and outside the above range, the improvement effect of conductivity and cycling performance will be limited.

In some embodiments, the mass ratio of carbon content to sulfur content (carbon content/sulfur content) is 0.33 to 23 based on the total mass of the negative electrode active material.

In some embodiments, the mass ratio of carbon content to sulfur content can be within the numerical range consisting of any two of the following listed numerical values as the end values: 0.58, 0.77, 0.92, 1.15, 1.92, 2.67, 3.33, 4.08, 4.60, 5.00 and 23. By further setting the mass ratio of carbon content to sulfur content within this range, the effect of improving the cycling performance of the battery can be effectively exerted.

In some embodiments, the mass ratio of sulfur content to silicon inner core content (sulfur content/silicon inner core content) is 0.1% to 4.27% based on the total mass of the negative electrode active material. In some embodiments, the mass ratio of sulfur content to silicon inner core content can be within the numerical range consisting of any two of the following listed numerical values as the end values: 0.1%, 0.51%, 1.22%, 1.24%, 1.26%, 1.27%, 1.28%, 1.29%, 2.09%, 3.17%, and 4.27%. By further setting the mass ratio of sulfur content to silicon inner core content within this range, the effect of improving the cycling performance of the battery can be effectively exerted.

In some embodiments, the mass ratio of silicon inner core content to carbon content (silicon inner core content/carbon content) is 15.47 to 246 based on the total mass of the negative electrode active material. In some embodiments, the mass ratio of silicon inner core content to carbon content can be within the numerical range consisting of any two of the following listed numerical values as the end values: 15.47, 19.16, 23.70, 29.88, 40.74, 41.17, 41.61, 41.96, 42.26, 42.43, 88.82, and 246. By further setting the mass ratio of silicon inner core content to carbon content within this range, the effect of improving the cycling performance of the battery can be effectively exerted.

In some embodiments, the silicon inner core is selected from one or more of elemental silicon, silicon alloys, and silicon oxides, and optionally silicon oxides.

In some embodiments, the silicon alloy is selected from one or more of ferrosilicon alloys, silicon-aluminum alloys, silicomanganese alloys, silicon-tin alloys, and silicon-germanium alloys, and optionally ferrosilicon alloys.

The silicon inner core material acts as an active material to provide lithium storage capacity. By further setting the silicon inner core material, the effect of improving the cycling performance of the battery can be effectively exerted.

In some embodiments, the carbon source material of the first cladding layer is selected from one or more of glucose, cellulose, sucrose, starch, phenolic resin, polyacrylonitrile, polyimide, polyvinylidene fluoride, carbon black, carbon nanotubes and graphene, and optionally selected from one or more of glucose, cellulose, carbon black, carbon nanotubes and graphene. Carbon can not only buffer the volume change of the silicon negative electrode during the charging and discharging process, but also improve the conductivity of the silicon inner core, and also avoid the agglomeration of the silicon inner core in the charge-discharge cycle. Also, the carbon source material has a small volume change during the charging and discharging process, and has good cycle stability performance. Moreover, the carbon source material itself is a mixed conductor of ions and electrons. In addition, carbon and silicon have similar chemical properties, and the two can be closely bonded. Therefore, by further setting the carbon source material, the effect of improving the cycling performance of the battery can be effectively exerted.

In some embodiments, the second cladding layer has a cladding rate of 70% to 100%. Moreover, in some embodiments, the cladding rate of the second cladding layer can be within the numerical range consisting of any two of the following listed numerical values as the end values: 70%, 83%, 92%, 98%, and 100%. In the present application, the cladding rate of the second cladding layer refers to the percentage of the coverage area of the second cladding layer on the surface of the first cladding layer to the total surface area of the first cladding layer when the second cladding layer is clad on the surface of the first cladding layer. If the cladding rate is too low and outside the above range, the artificial SEI film formed in situ is not dense and firm enough, so that the desired improvement effect cannot be achieved. By further setting the specific range of the cladding rate of the second cladding layer, the effect of improving the cycling performance of the battery can be effectively exerted.

In some embodiments, the thickness of the second cladding layer is 4 nm to 70 nm, and in some embodiments, the thickness of the second cladding layer can be within the numerical range consisting of any two of the following listed numerical values as the end values: 4 nm, 10 nm, 23 nm, 32 nm, 47 nm and 70 nm.

In some embodiments, the thickness of the first cladding layer is 5 nm to 120 nm, and in some embodiments, the thickness of the first cladding layer can be within the numerical range consisting of any two of the following listed numerical values as the end values: 5 nm, 10 nm, 12 nm, 22 nm, 25 nm, 30 nm, 50 nm, 78 nm, 98 nm and 120 nm.

In some embodiments, the particle size of the negative electrode active material is 0.5 μm to 8 μm, and in some embodiments, the particle size of the negative electrode active material can be within the numerical range consisting of any two of the following listed numerical values as the end values: 0.5 μm, 1 μm, 2 μm, 3 μm, 4 μm, 5 μm, 6 μm, 7 μm and 8 μm.

In the negative electrode active material, if the thickness of the second cladding layer, the thickness of the first cladding layer, and the particle size of the negative electrode active material are too large, the lithium ion conduction path will be too long and the kinetics will become poor; if the particle size is too small, the specific surface area of particles will be too large, which will increase side reactions, increase active lithium consumption, and decrease coulombic efficiency. By further setting the thickness of the second cladding layer, the thickness of the first cladding layer, and the particle size of the negative electrode active material, the effect of improving the cycling performance of the battery can be effectively exerted.

Further, in another embodiment of the present application, the present application proposes a preparation method of a negative electrode active material, which comprises the following steps (1) to (4) or (a) to (c).

Among them, the steps (1) to (4) are:

step (1): dissolving a carbon source material as a first cladding layer in a solvent to obtain a solution;

step (2): adding a silicon inner core material to the solution obtained in the above step (1), and evaporating the mixture to dryness while stirring to obtain a powder;

step (3): heating the powder obtained in the step (2) to 700° C. to 1100° C. under vacuum inert gas conditions, sintering and holding it at this temperature, and then slowly cooling it down to room temperature to obtain a silicon inner core clad with a first cladding layer on the surface;

step (4): well mixing the silicon inner core clad with the first cladding layer on the surface obtained in the step (3) and an elemental sulfur material as a second cladding layer, heating the mixture to 200° C. to 350° C. under vacuum conditions, sintering and holding it at this temperature, and then slowly cooling it down to room temperature to obtain the negative electrode active material.

The steps (a) to (c) are:

step (a): dispersing a carbon source material as a first cladding layer in a solvent to obtain a dispersion;

step (b): adding a silicon inner core material to the dispersion obtained in the above step (a), and stirring and drying the mixture to obtain a silicon inner core clad with a first cladding layer on the surface;

step (c): well mixing the silicon inner core clad with the first cladding layer on the surface obtained in the step (b) and an elemental sulfur material as a second cladding layer, heating the mixture to 200° C. to 350° C. under vacuum conditions, sintering and holding it at this temperature, and then slowly cooling it down to room temperature to obtain the negative electrode active material.

In some embodiments, the heating rate in the step (3) is 1° C./min to 5° C./min.

In some embodiments, the heating rate in the step (4) or the step (c) is 1° C./min to 5° C./min.

In some embodiments, the holding time in the step (3) is 3 h to 6 h.

In some embodiments, the holding time in the step (4) or the step (c) is 2.5 h to 7 h.

By adjusting the specific conditions in the above steps, the above-mentioned negative electrode active material of the present application can be obtained.

Moreover, the secondary battery, battery module, battery pack and electrical apparatus of the present application will be described hereafter with appropriate reference to the drawings.

Secondary Battery

In an embodiment of the present application, a secondary battery is provided.

Generally, the secondary battery comprises a negative electrode sheet, a positive electrode sheet, an electrolyte, and a separator. During the charging and discharging process of the battery, active ions are intercalated and deintercalated back and forth between the positive electrode sheet and the negative electrode sheet. The electrolyte serves to conduct ions between the positive electrode sheet and the negative electrode sheet. The separator is provided between the positive electrode sheet and the negative electrode sheet, and mainly functions to prevent a short circuit between the positive electrode and the negative electrode while allowing ions to pass through.

[Negative Electrode Sheet]

The negative electrode sheet comprises a negative electrode current collector and a negative electrode film layer provided on at least one surface of the negative electrode current collector, wherein the negative electrode film layer comprises the abovementioned negative electrode active material of the present invention.

As an example, the negative electrode current collector has two opposite surfaces in its own thickness direction, and the negative electrode film layer is provided on either one or both of the two opposite surfaces of the negative electrode current collector.

In some embodiments, the negative electrode current collector can be a metal foil or a composite current collector. For example, a copper foil can be used as the metal foil. The composite current collector may comprise a high molecular material substrate layer and a metal layer formed on at least one surface of the high molecular material substrate. The composite current collector can be formed by forming a metal material (copper, copper alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), polyethylene (PE), and the like).

In some embodiments, the negative electrode active material may be a negative electrode active material for batteries well known in the art. As an example, the negative electrode active material may include at least one of artificial graphite, natural graphite, soft carbon, hard carbon, a silicon-based material, a tin-based material, lithium titanate, and the like. The silicon-based material may be selected from at least one of elemental silicon, a silicon-oxygen compound, a silicon-carbon composite, a silicon-nitrogen composite, and a silicon alloy. The tin-based material may be selected from at least one of elemental tin, a tin-oxygen compound, and a tin alloy. However, the present application is not limited to these materials, and other conventional materials useful as negative electrode active materials for batteries can also be used. These negative electrode active materials may be used alone or in combination of two or more thereof.

In some embodiments, the negative electrode film layer further optionally comprises a binder. The binder may be selected from at least one of styrene butadiene rubber (SBR), polyacrylic acid (PAA), sodium polyacrylate (PAAS), poly-acrylamide (PAM), polyvinyl alcohol (PVA), sodium alg-inate (SA), polymethacrylic acid (PMAA), and carboxym-ethyl chitosan (CMCS).

In some embodiments, the negative electrode film layer further optionally comprises a conductive agent. The con-ductive agent may be selected from at least one of super-conducting carbon, acetylene black, carbon black, Ketjen black, carbon dot, carbon nanotube, graphene, and carbon nanofiber.

In some embodiments, the negative electrode film layer may further optionally comprise other auxiliaries, for example, a thickener (e. g., sodium carboxymethyl cellulose (CMC-Na)) and the like.

In some embodiments, the negative electrode sheet can be prepared by dispersing the components for preparing the negative electrode sheet, for example, the negative electrode active material, the conductive agent, the binder and any other components in a solvent (for example, deionized water) to form a negative electrode slurry; and coating the negative electrode slurry on a negative electrode current collector, followed by oven drying, cold pressing and other procedures, to obtain the negative electrode sheet.

[Positive Electrode Sheet]

The positive electrode sheet comprises a positive elec-trode current collector and a positive electrode film layer provided on at least one surface of the positive electrode current collector, and the positive electrode film layer com-prises the positive electrode active material of the first aspect of the present application.

As an example, the positive electrode current collector has two opposite surfaces in its own thickness direction, and the positive electrode film layer is arranged on either or both of the two opposite surfaces of the positive electrode current collector.

In some embodiments, the positive electrode current collector can be a metal foil or a composite current collector. For example, an aluminum foil can be used as the metal foil. The composite current collector may include a high molecu-lar material substrate layer and a metal layer formed on at least one surface of the high molecular material substrate layer. The composite current collector can be formed by forming a metal material (aluminum, aluminum alloy, nickel, nickel alloy, titanium, titanium alloy, silver and silver alloy, etc.) on a high molecular material substrate (such as polypropylene (PP), polyethylene terephthalate (PET), poly-butylene terephthalate (PBT), polystyrene (PS), polyethyl-ene (PE), and the like).

In some embodiments, the positive electrode active mate-rial may be a positive electrode active material for batteries well known in the art. As an example, the positive electrode active material may include at least one of the following materials: a lithium-containing phosphate of olivine struc-ture, a lithium transition metal oxide, and a respective modified compound thereof. However, the present applica-tion is not limited to these materials, and other conventional materials useful as positive electrode active materials for batteries can also be used. These positive electrode active materials may be used alone or in combination of two or more thereof. Among them, examples of lithium transition metal oxides may include but are not limited to, at least one of a lithium-cobalt oxide (such as $LiCoO_2$), a lithium-nickel oxide (such as $LiNiO_2$), a lithium-manganese oxide (such as $LiMnO_2$ and $LiMn_2O_4$), a lithium-nickel-cobalt oxide, a lithium-manganese-cobalt oxide, a lithium-nickel-manga-nese oxide, a lithium-nickel-cobalt-manganese oxide (such as $LiN_{1/3}Co_{1/3}Mn_{1/3}O_2$ (may also be abbreviated as NCM333), $LiNi_{0.5}Co_{0.2}Mn_{0.3}O_2$ (may also be abbreviated as NCM523), $LiNi_{0.5}Co_{0.25}Mn_{0.25}O_2$ (may also be abbrevi-ated as NCM211), $LiNi_{0.6}Co_{0.2}Mn_{0.2}O_2$ (may also be abbre-viated as NCM622), $LiNi_{0.8}Co_{0.1}Mn_{0.1}O_2$ (may also be abbreviated as NCM811)), a lithium-nickel-cobalt-alumi-num oxide (such as $LiNi_{0.85}Co_{0.15}Al_{0.05}O_2$) and a modified compound thereof. Examples of the lithium-containing phosphate of olivine structure may include, but are not limited to, at least one of lithium iron phosphate (such as $LiFePO_4$ (may also be abbreviated as LFP)), a composite material of lithium iron phosphate and carbon, lithium manganese phosphate (such as $LiMnPO_4$), a composite material of lithium manganese phosphate and carbon, lithium iron manganese phosphate, and a composite material of lithium manganese iron phosphate and carbon.

In some embodiments, the positive electrode film layer further optionally comprises a binder. As an example, the binder may include at least one of polyvinylidene fluoride (PVDF), polytetrafluoroethylene (P T F E), a vinylidene fluoride-tetrafluoroethylene-propylene terpolymer, a vinylidene fluoride-hexafluoropropylene-tetrafluoroethyl-ene terpolymer, a tetrafluoroethyl ene-hexafluoropropylene copolymer and a fluorine-containing acrylate resin.

In some embodiments, the positive electrode film layer further optionally comprises a conductive agent. For example, the conductive agent may include at least one of superconducting carbon, acetylene black, carbon black, Ketjen black, carbon dot, carbon nanotubes, graphene, and carbon nanofibers.

In some embodiments, the positive electrode sheet can be prepared by dispersing the components for preparing the positive electrode sheet, for example, the positive electrode active material, the conductive agent, the binder and any other components in a solvent (for example, N-methyl pyrrolidone) to form a positive electrode slurry; and coating the positive electrode slurry on a positive electrode current collector, followed by oven drying, cold pressing and other procedures, to obtain the positive electrode sheet.

[Electrolyte]

The electrolyte serves to conduct ions between the posi-tive electrode sheet and the negative electrode sheet. The type of the electrolyte is not particularly limited in the present application, and can be selected according to requirements. For example, the electrolyte may be in a liquid, gel, or full solid state.

In some embodiments, an electrolyte solution is used as the electrolyte. The electrolyte solution comprises an elec-trolyte salt, a solvent and an additive.

In some embodiments, the electrolyte salt may be selected from at least one of lithium hexafluorophosphate, lithium tetrafluoroborate, lithium perchlorate, lithium hexafluoro-arsenate, lithium bis(fluorosulfonyl)imide, lithium bis(trifluoromethanesulfonyl)imide, lithium trifluoromethanesulfonate, lithium difluorophosphate, lithium difluoro(oxalate)borate, lithium bis(oxalate)borate, lithium difluoro bis(oxalate)phosphate, and lithium tetrafluoro(oxalate)phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution comprises additives, including fluoroethylene carbonate and/or vinylene carbonate. In addition, other additives such as negative electrode film-forming additives, positive electrode film-forming additives can be included, as well as additives that can improve certain properties of the battery, such as additives that improve the overcharge performance of the battery, and additives that improve the high-temperature or low-temperature performance of the battery.

The electrolyte solution contains fluoroethylene carbonate and/or vinylene carbonate, which can trigger a nucleophilic reaction thereof with polysulfides, thereby generating an artificial SEI film in situ, enhancing the protection on the surface of the negative electrode material and improving the rate and cycling performance. As additives in the electrolyte solution, it is necessary to add fluoroethylene carbonate and vinylene carbonate, which is conducive to the rapid occurrence of nucleophilic reactions and the complete reaction of polysulfides.

In some embodiments, in the electrolyte solution, the content of the fluoroethylene carbonate and/or the vinylene carbonate is 0.5 mass % to 13 mass % in terms of mass percentage, and in some embodiments, the content of the fluoroethylene carbonate and/or the vinylene carbonate can be within the numerical range consisting of any two of the following numerical values as the end values: 0.5 mass %, 0.8 mass %, 1 mass %, 2 mass %, 3 mass %, 4 mass %, 5 mass %, 6 mass %, 7 mass %, 8 mass %, 9 mass %, 10 mass %, 11 mass %, and 13 mass % The content of fluoroethylene carbonate and/or vinylene carbonate in the electrolyte solution is set to be within the above range. If the content of fluoroethylene carbonate and/or vinylene carbonate is too low and outside the above range, the improvement of battery performance is limited; and if there is too much fluoroethylene carbonate and/or vinylene carbonate, it will cause incomplete dissolution thereof in the solvent and will also have a negative effect on other battery properties, such as reduced conductivity decreases, and increased gas production. By further setting the content of the fluoroethylene carbonate and/or the vinylene carbonate, the effect of improving the cycling performance of the battery can be effectively exerted.

In some embodiments, when the electrolyte solution contains fluoroethylene carbonate and vinylene carbonate, the mass ratio of the content of the fluoroethylene carbonate to the content of the vinylene carbonate (fluoroethylene carbonate content/vinylene carbonate content) in the electrolyte solution is 0.3 to 5.5. In some embodiments, the mass ratio of the content of the fluoroethylene carbonate to the content of the vinylene carbonate can be within the numerical range consisting of any two of the following listed numerical values as the end values: 0.3, 0.5, 1.0, 1.5, 2.0, 2.5, 3.0, 3.5, 4.0, and 5.5. As additives in the electrolyte solution, in addition to setting the total content of the fluoroethylene carbonate and vinylene carbonate within the above-mentioned content range, it is also necessary to set the content mass ratio of the fluoroethylene carbonate to the vinylene carbonate within the above mass ratio range. If the mass ratio of the two is too low and outside the above range, it means that too much vinylene carbonate is added, which is not conducive to the rapid occurrence of nucleophilic reactions and the complete reaction of polysulfides, affecting the ionic conductivity of the electrolyte solution and increasing the impedance of the battery cell; if the mass ratio of the two is too high and outside the above range, it means that the content of fluoroethylene carbonate is too high, which will deteriorate the storage gas production performance of the battery cell, increase the risk of battery cell failure, affect the ionic conductivity of the electrolyte solution, and increase the impedance of the battery cell. By further setting the mass ratio of the content of the fluoroethylene carbonate to the content of the vinylene carbonate, the effect of improving the cycling performance of the battery can be effectively exerted.

In some embodiments, the mass ratio of the content of fluoroethylene carbonate and/or vinylene carbonate in the electrolyte solution to the content of elemental sulfur in the negative electrode active material (the content of fluoroethylene carbonate and/or vinylene carbonate in the electrolyte solution/the content of elemental sulfur in the negative electrode active material) is 0.42 to 60. In some embodiments, the mass ratio of the content of fluoroethylene carbonate and/or vinylene carbonate to the content of elemental sulfur in the negative electrode active material can be within the numerical range consisting of any two of the following listed numerical values as the end values: 0.42, 0.67, 0.83, 1.5, 1.67, 2.00, 2.50, 3.00, 3.33, 4.17, 5.00, 6.67, 7.50, 8.33, 9.17, 10.83, 12.00, and 60. The mass ratio of the content of fluoroethylene carbonate and/or vinylene carbonate in the electrolyte solution to the content of elemental sulfur is set within the above range. If the sulfur content is too much and outside the above range, it will lead to the incomplete reaction of the formed polysulfides, increasing the consumption of active lithium and deteriorating the cycling performance; and if the sulfur content is too small and outside the above range, it will not improve the cycle. By further setting the mass ratio of the content of fluoroethylene carbonate and/or vinylene carbonate to the content of elemental sulfur in the negative electrode active material, the effect of improving the cycling performance of the battery can be effectively exerted.

[Separator]

In some embodiments, the secondary battery also comprises a separator. The type of the separator is not particularly limited in the present application, and any well-known separator with a porous structure having good chemical stability and mechanical stability may be selected.

In some embodiments, the material of the separator may be selected from at least one of glass fiber, non-woven cloth, polyethylene, polypropylene, and polyvinylidene fluoride. The separator may be a single-layer film or a multi-layer composite film, and is not particularly limited. When the separator is a multi-layer composite film, the materials of the layers may be the same or different, which is not particularly limited.

In some embodiments, the positive electrode sheet, the negative electrode sheet, and the separator can be made into an electrode assembly by a winding process or a stacking process.

In some embodiments, the secondary battery may include an outer package. The outer package can be used to encapsulate the above-mentioned electrode assembly and electrolyte.

In some embodiments, the outer package of the secondary battery may be a hard case, such as a hard plastic case, an aluminum case, a steel case, and the like. The outer package of the secondary battery may also be a soft pack, such as a bag-type soft pack. The material of the soft pack may be a plastic, and examples of the plastic include polypropylene, polybutylene terephthalate and polybutylene succinate, etc.

The present application has no particular limitation on the shape of the secondary battery, which can be cylindrical, square or any other shape. For example, FIG. 1 shows a secondary battery 5 with a square structure as an example.

Figure 2:
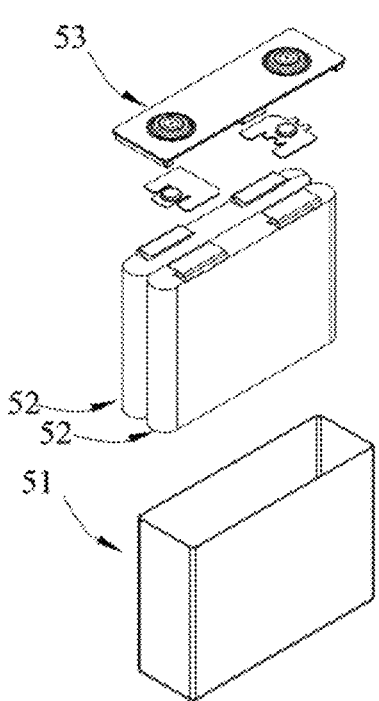
FIG. 2 is an exploded view of the secondary battery according to an embodiment of the present application shown in FIG. 1.

In some embodiments, referring to FIG. 2, the outer package may comprise a case 51 and a top cover assembly 53. Here, the case 51 can include a bottom plate and a side plate connected to the bottom plate, with the bottom plate and the side plate enclosing to form an accommodating cavity. The case 51 has an opening that communicates with the accommodating cavity, and the top cover assembly 53 may cover the opening to close the accommodating cavity. The positive electrode sheet, the negative electrode sheet, and the separator can be formed into an electrode assembly 52 by a winding process or a stacking process. The electrode assembly 52 is encapsulated within the accommodating cavity. The electrolyte solution impregnates the electrode assembly 52. The number of electrode assemblies 52 comprised in the secondary battery 5 may be one or more, which can be selected by those skilled in the art according to specific actual requirements.

Battery Module

In some embodiments, the secondary batteries may be assembled into a battery module, and the number of the secondary batteries included in the battery module may be one or more, and the specific number may be selected by those skilled in the art according to the application and capacity of the battery module.

Figure 3:
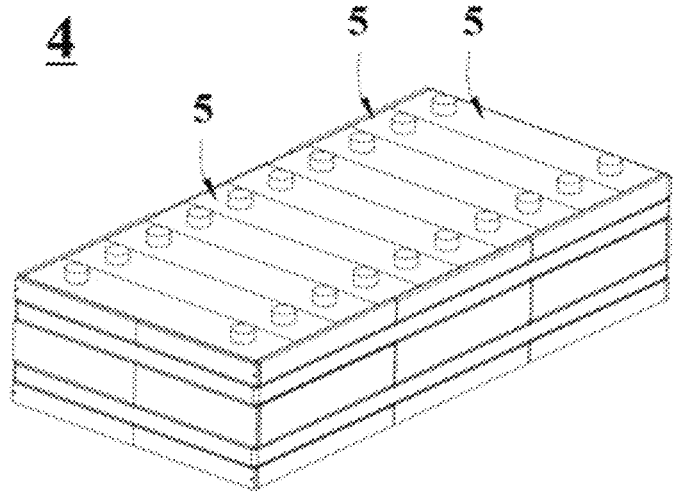
FIG. 3 is a schematic diagram of a battery module according to an embodiment of the present application.

FIG. 3 shows a battery module 4 as an example. Referring to FIG. 3, in the battery module 4, a plurality of secondary batteries 5 can be sequentially arranged along the length direction of the battery module 4. Of course, any other arrangements are also possible. The plurality of secondary batteries 5 may further be fixed by fasteners.

Optionally, the battery module 4 can further include a shell having an accommodating space, in which the plurality of secondary batteries 5 are accommodated.

Battery Pack

In some embodiments, the battery module may further be assembled into a battery pack, the number of battery module contained in the battery pack may be one or more, and the specific number can be selected by those skilled in the art according to the use and capacity of the battery pack.

Figure 4:
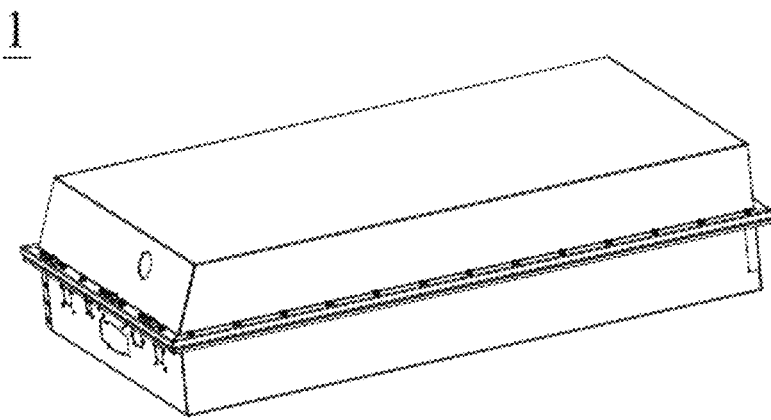
FIG. 4 is a schematic view of a battery pack according to an embodiment of the present application.
Figure 5:
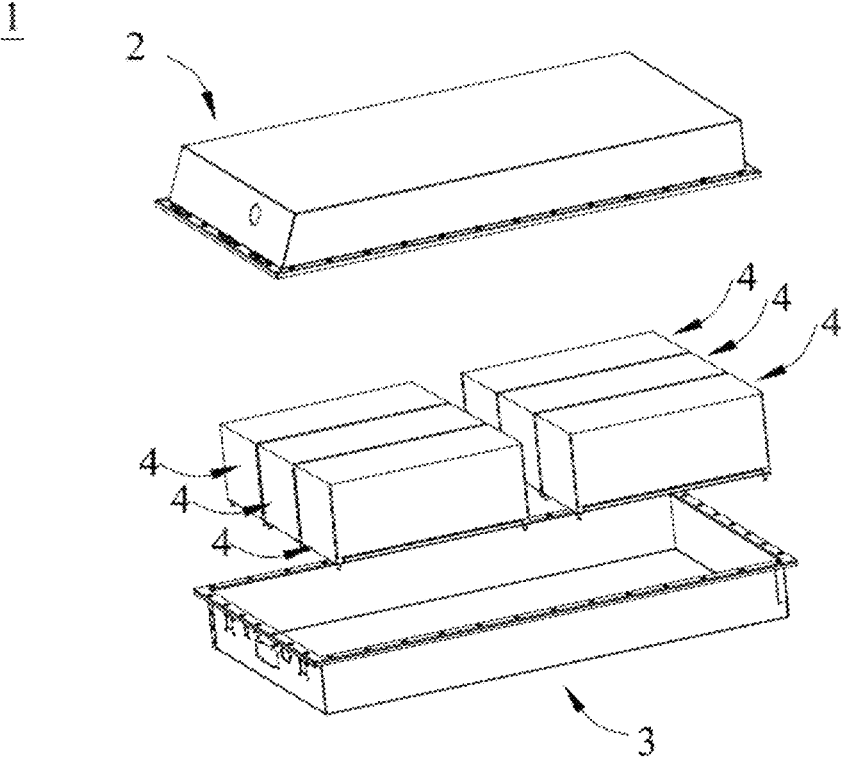
FIG. 5 is an exploded view of the battery pack according to an embodiment of the present application shown in FIG. 4.

FIGS. 4 and 5 show a battery pack 1 as an example. Referring to FIGS. 4 and 5, the battery pack 1 may comprise a battery box and a plurality of battery modules 4 provided in the battery box. The battery box comprises an upper box 2 and a lower box 3, the upper box 2 can cover the lower box 3 to form a closed space for accommodating the battery modules 4. The plurality of battery modules 4 may be arranged in the battery box in any manner.

Electrical Apparatus

Additionally, the present application further provides an electrical apparatus comprising at least one of the secondary battery, battery module or battery pack provided in the present application. The secondary battery, battery module, or battery pack can be used as a power source for the electrical apparatus, and can also be used as an energy storage unit for the electrical apparatus. The electrical apparatus may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, and an energy storage system, etc.

For the electrical apparatus, the secondary battery, the battery module, or the battery pack may be selected according to its use requirements.

Figure 6:
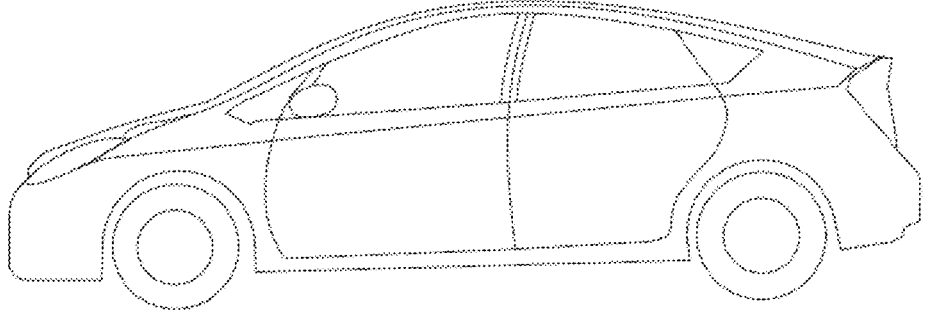
FIG. 6 is a schematic view of an electrical apparatus in which a secondary battery is used as a power source according to an embodiment of the present application.

FIG. 6 is an example of an electrical apparatus. The electrical apparatus is an all-electric vehicle, a hybrid electric vehicle, a plug-in hybrid electric vehicle, or the like. In order to meet the requirements of the electrical apparatus for high power and high energy density of secondary batteries, a battery pack or a battery module may be used.

As another example, the apparatus may be a mobile phone, a tablet, a laptop, etc. The apparatus is generally required to be light and thin, and may use a secondary battery as a power source.

EXAMPLES

Examples of the present application will be described hereinafter. The examples described below are exemplary and only used to explain the present application, and are not to be construed as limiting the present application. Where specific techniques or conditions are not specified in the examples, the techniques or conditions described in the literatures of the art or the product specifications are followed. All of the used agents or instruments which are not specified with the manufacturer are conventional commercially-available products.

Example 1

① Preparation of Negative Electrode Active Material

In Example 1, the preparation method of the negative electrode active material comprises the following steps (1) to (4), wherein the specific conditions of the steps (1) to (4) are shown in Table 1.

(1) Dissolving 5 g of anhydrous glucose (the carbon source material of the first cladding layer) in 500 ml of deionized water (solvent), and stirring the mixture until the glucose is completely dissolved to obtain a solution;

(2) Adding 100 g of a ferrosilicon alloy powder (silicon inner core material) to the solution obtained in the step (1), and evaporating the mixture to dryness while stirring to obtain a powder;

(3) Putting the powder obtained in the step (2) into a sintering furnace, vacuumizing the furnace and introducing nitrogen thereto, and heating the powder to 900° C. at a heating rate of 1° C./min under vacuum nitrogen conditions, holding it at this temperature for 4 h, and then slowly cooling it down to room temperature to obtain a silicon inner core clad with a first cladding layer on the surface;

(4) Well mixing the silicon inner core clad with the first cladding layer on the surface obtained in the step (3) with 2 g of elemental sulfur (elemental sulfur material of a second cladding layer), putting the mixture into a tube furnace, vacuumizing the furnace, heating the mixture to 300° C. at a heating rate of 1° C./min under vacuum conditions, sintering and holding it at this temperature for 4 h, and then slowly cooling it down to room temperature to obtain the negative electrode active material.

Various parameters of the negative electrode active material are shown in Table 3.

②Preparation of Electrolyte Solution

The electrolyte solution was obtained as follows: mixing ethylene carbonate (EC), ethyl methyl carbonate (EMC), and diethyl carbonate (DEC) at a volume ratio of 3:5:2 to obtain an organic solvent, then dissolving $LiPF_6$ in the above organic solvent, and adding fluoroethylene carbonate (FEC) and/or vinylene carbonate (VC) as an additive, wherein the specific composition of the electrolyte solution is shown in Table 3, the concentration of $LiPF_6$ is 1 mol/L, the mass proportion of FEC in the electrolyte solution is 4%, and the mass proportion of VC in the electrolyte solution is 2%.

③Performance Evaluation

For the negative electrode active material prepared in the above ①, the performance test was carried out by the following method.

(i) Preparation Method of Button Battery

For the negative electrode active material prepared in the above ①, a metal lithium sheet was used as the counter electrode, a Celgard 2400 separator was used, the electrolyte solution prepared in the above ② was injected, and they were assembled to obtain a button battery.

(ii) Button Battery Cycling Performance Test

Under the environment of 25° C. and normal pressure, the button battery was discharged to a voltage of 0.005 V at a constant current rate of 0.1 C, then to a voltage of 0.005 V at a constant current rate of 0.05 C, and the specific discharge capacity at this point was recorded, which was the first lithiation capacity; thereafter, it was charged at a constant current rate of 0.1 C until the voltage was 1.5 V, and the specific charge capacity at this point was recorded, which was the first delithiation capacity. The button battery was subjected to 50-cycle charge and discharge tests according to the above method, and the delithiation capacity was recorded for each cycle. The results are shown in Table 3.

The cycling capacity retention rate (%) of the negative electrode active material=delithiation capacity of the 50th cycle/delithiation capacity of the first cycle×100%.

<Example 2>, <Example 6> to <Example 44>, <Comparative Example 1> to

Comparative Example 2

①Preparation of Negative Electrode Active Material

In Examples 2, 6 to 44, and Comparative Examples 1 and 2, the same preparation method as Example 1 was adopted, except for the changes in the specific conditions in the steps (1) to (4) as shown in Table 1, thus providing negative electrode active materials.

Various parameters of the negative electrode active materials are shown in Table 3.

②Preparation of Electrolyte Solution

The electrolyte solution was obtained by the same preparation method as in Example 1, and the specific composition of the electrolyte solution is shown in Table 3.

③Performance Evaluation

The same evaluation method as in Example 1 was used for performance evaluation, and the evaluation results are shown in Table 3.

Example 3

①Preparation of Negative Electrode Active Material

In Example 3, the preparation method of the negative electrode active material comprises the following steps (a) to (c), wherein the specific conditions of the steps (a) to (c) are shown in Table 2.

(a) Dispersing 5 g of carbon black (the carbon source material of a first cladding layer) in 500 ml of deionized water (solvent), and ultrasonically dispersing the mixture until the slurry is uniform without agglomeration to obtain a dispersion;

(b) adding 100 g of a silicon monoxide powder (silicon inner core material) into the dispersion obtained in the step (a), well stirring the mixture, and adding the slurry into spray drying equipment for spray drying to obtain a silicon inner core clad with a first cladding layer on the surface;

(c) Well mixing the silicon inner core clad with the first cladding layer on the surface obtained in the step (b) with 2 g of elemental sulfur, putting the mixture into a tube furnace, vacuumizing the furnace, heating the mixture to 300° C. at a heating rate of 1° C./min under vacuum conditions, sintering and holding it at this temperature for 4 h, and then slowly cooling it down to room temperature to obtain a negative electrode active material.

Various parameters of the negative electrode active material are shown in Table 3.

②Preparation of Electrolyte Solution

The electrolyte solution was obtained by the same preparation method as in Example 1, and the specific composition of the electrolyte solution is shown in Table 3.

③Performance Evaluation

The same evaluation method as in Example 1 was used for performance evaluation, and the evaluation results are shown in Table 3.

<Example 4> to <Example 5>

①Preparation of Negative Electrode Active Material

In Examples 4 and 5, the same preparation method as Example 3 was adopted, except for the changes in the specific conditions in the steps (a) to (c) as shown in Table 2, thus providing negative electrode active materials.

Various parameters of the negative electrode active materials are shown in Table 3.

②Preparation of Electrolyte Solution

The electrolyte solution was obtained by the same preparation method as in Example 1, and the specific composition of the electrolyte solution is shown in Table 3.

③Performance Evaluation

The same evaluation method as in Example 1 was used for performance evaluation, and the evaluation results are shown in Table 3.

TABLE 1

| | Step (1): | Step (2): | Step (3): | | | Step (4): | | | |
|---|---|---|---|---|---|---|---|---|---|
| | Carbon source material | Silicon inner core material | Heating rate (° C./min) | Holding temperature (° C.) | Holding time (h) | Elemental sulfur material | Heating rate (° C./min) | Holding temperature (° C.) | Holding time (h) |
| Example 1 | Glucose | Ferrosilicon alloy | 1° C./min | 900° C. | 4 h | Elemental sulfur | 1° C./min | 300° C. | 4 h |
| Example 2 | Glucose | Elemental silicon | 5° C./min | 1100° C. | 6 h | Elemental sulfur | 5° C./min | 350° C. | 7 h |
| Example 6 | Cellulose | Silicon monoxide | 1° C./min | 700° C. | 3 h | Elemental sulfur | 1° C./min | 200° C. | 2.5 h |
| Example 7 | Glucose | Silicon monoxide | 1° C./min | 900° C. | 4 h | Elemental sulfur | 1° C./min | 300° C. | 4 h |
| Example 8 | Glucose | Silicon monoxide | 1° C./min | 900° C. | 4 h | Elemental sulfur | 1° C./min | 300° C. | 4 h |
| Example 9 | Glucose | Silicon monoxide | 1° C./min | 900° C. | 4 h | Elemental sulfur | 1° C./min | 300° C. | 4 h |
| Example 10 | Glucose | Silicon monoxide | 1° C./min | 900° C. | 4 h | Elemental sulfur | 1° C./min | 300° C. | 4 h |
| Example 11 | Glucose | Silicon monoxide | 1° C./min | 900° C. | 4 h | Elemental sulfur | 1° C./min | 300° C. | 4 h |
| Example 12 | Glucose | Silicon monoxide | 1° C./min | 900° C. | 4 h | Elemental sulfur | 1° C./min | 300° C. | 4 h |
| Example 13 | Glucose | Silicon monoxide | 1° C./min | 900° C. | 4 h | Elemental sulfur | 1° C./min | 300° C. | 4 h |
| Example 14 | Glucose | Silicon monoxide | 1° C./min | 900° C. | 4 h | Elemental sulfur | 1° C./min | 300° C. | 4 h |
| Example 15 | Glucose | Silicon monoxide | 1° C./min | 900° C. | 4 h | Elemental sulfur | 1° C./min | 300° C. | 4 h |
| Example 16 | Glucose | Silicon monoxide | 1° C./min | 900° C. | 4 h | Elemental sulfur | 1° C./min | 300° C. | 4 h |
| Example 17 | Glucose | Silicon monoxide | 1° C./min | 900° C. | 4 h | Elemental sulfur | 1° C./min | 300° C. | 4 h |
| Example 18 | Glucose | Silicon monoxide | 1° C./min | 900° C. | 4 h | Elemental sulfur | 1° C./min | 300° C. | 4 h |
| Example 19 | Glucose | Silicon monoxide | 1° C./min | 900° C. | 4 h | Elemental sulfur | 1° C./min | 300° C. | 4 h |
| Example 20 | Glucose | Silicon monoxide | 1° C./min | 900° C. | 4 h | Elemental sulfur | 1° C./min | 300° C. | 4 h |
| Example 21 | Glucose | Silicon monoxide | 1° C./min | 900° C. | 4 h | Elemental sulfur | 1° C./min | 300° C. | 4 h |
| Example 22 | Glucose | Silicon monoxide | 1° C./min | 900° C. | 4 h | Elemental sulfur | 1° C./min | 300° C. | 4 h |
| Example 23 | Glucose | Silicon monoxide | 1° C./min | 900° C. | 4 h | Elemental sulfur | 1° C./min | 300° C. | 4 h |
| Example 24 | Glucose | Silicon monoxide | 1° C./min | 900° C. | 4 h | Elemental sulfur | 1° C./min | 300° C. | 4 h |
| Example 25 | Glucose | Silicon monoxide | 1° C./min | 900° C. | 4 h | Elemental sulfur | 1° C./min | 300° C. | 4 h |
| Example 26 | Glucose | Silicon monoxide | 1° C./min | 900° C. | 4 h | Elemental sulfur | 1° C./min | 300° C. | 4 h |
| Example 27 | Glucose | Silicon monoxide | 1° C./min | 900° C. | 4 h | Elemental sulfur | 1° C./min | 300° C. | 4 h |
| Example 28 | Glucose | Silicon monoxide | 1° C./min | 900° C. | 4 h | Elemental sulfur | 1° C./min | 300° C. | 4 h |
| Example 29 | Glucose | Silicon monoxide | 1° C./min | 900° C. | 4 h | Elemental sulfur | 1° C./min | 300° C. | 4 h |
| Example 30 | Glucose | Silicon monoxide | 1° C./min | 900° C. | 4 h | Elemental sulfur | 1° C./min | 300° C. | 4 h |
| Example 31 | Glucose | Silicon monoxide | 1° C./min | 900° C. | 4 h | Elemental sulfur | 1° C./min | 300° C. | 4 h |
| Example 32 | Glucose | Silicon monoxide | 1° C./min | 900° C. | 4 h | Elemental sulfur | 1° C./min | 300° C. | 4 h |
| Example 33 | Glucose | Silicon monoxide | 1° C./min | 900° C. | 4 h | Elemental sulfur | 1° C./min | 300° C. | 4 h |
| Example 34 | Glucose | Silicon monoxide | 1° C./min | 900° C. | 4 h | Elemental sulfur | 1° C./min | 300° C. | 4 h |
| Example 35 | Glucose | Silicon monoxide | 1° C./min | 900° C. | 4 h | Elemental sulfur | 1° C./min | 300° C. | 4 h |
| Example 36 | Glucose | Silicon monoxide | 1° C./min | 900° C. | 4 h | Elemental sulfur | 1° C./min | 300° C. | 4 h |
| Example 37 | Glucose | Silicon monoxide | 1° C./min | 900° C. | 4 h | Elemental sulfur | 1° C./min | 300° C. | 4 h |

The preparation method of the negative electrode active material comprises the following steps (1) to (4)

TABLE 1-continued

| | | | | | | | | | |
|---|---|---|---|---|---|---|---|---|---|
| | | | | The preparation method of the negative electrode active material comprises the following steps (1) to (4) | | | | | |
| | Step (1): | Step (2): | Step (3): | | | Step (4): | | | |
| | Carbon source material | Silicon inner core material | Heating rate (° C./min) | Holding temperature (° C.) | Holding time (h) | Elemental sulfur material | Heating rate (° C./min) | Holding temperature (° C.) | Holding time (h) |
| Example 38 | Glucose | Silicon monoxide | 1° C./min | 900° C. | 4 h | Elemental sulfur | 1° C./min | 300° C. | 4 h |
| Example 39 | Glucose | Silicon monoxide | 1° C./min | 900° C. | 4 h | Elemental sulfur | 1° C./min | 300° C. | 4 h |
| Example 40 | Glucose | Silicon monoxide | 1° C./min | 900° C. | 4 h | Elemental sulfur | 1° C./min | 300° C. | 4 h |
| Example 41 | Glucose | Silicon monoxide | 1° C./min | 900° C. | 4 h | Elemental sulfur | 1° C./min | 300° C. | 4 h |
| Example 42 | Glucose | Silicon monoxide | 1° C./min | 900° C. | 4 h | Elemental sulfur | 1° C./min | 300° C. | 4 h |
| Example 43 | Glucose | Silicon monoxide | 1° C./min | 900° C. | 4 h | Elemental sulfur | 1° C./min | 300° C. | 4 h |
| Example 44 | Glucose | Silicon monoxide | 1° C./min | 900° C. | 4 h | Elemental sulfur | 1° C./min | 300° C. | 4 h |
| Comparative Example 1 | Glucose | Silicon monoxide | 1° C./min | 900° C. | 4 h | / | 1° C./min | 300° C. | 4 h |
| Comparative Example 2 | Glucose | Silicon monoxide | 1° C./min | 900° C. | 4 h | Carbon-based material | 1° C./min | 300° C. | 4 h |

TABLE 2

| | | | | | | |
|---|---|---|---|---|---|---|
| | | | The preparation method of the negative electrode active material comprises the steps (a) to (c) | | | |
| | Step (a): | Step (b): | Step (c): | | | |
| | Carbon source material | Silicon inner core material | Elemental sulfur material | Heating rate (° C./min) | Holding temperature (° C.) | Holding time (h) |
| Example 3 | Carbon black | Silicon monoxide | Elemental sulfur | 1° C./min | 300° C. | 4 h |
| Example 4 | Graphene | Silicon monoxide | Elemental sulfur | 5° C./min | 350° C. | 7 h |
| Example 5 | Carbon nanotubes | Silicon monoxide | Elemental sulfur | 1° C./min | 200° C. | 2.5 h |

TABLE 3

| | Silicon inner core Type | First cladding layer (Carbon-containing layer) | | | Second cladding layer (Elemental sulfur layer) | | | | Mass ratio of carbon content/sulfur content in negative electrode active material | Mass ratio of sulfur content/silicon content in negative electrode active material | Mass ratio of silicon inner core content/carbon content in negative electrode active material | Particle size of negative electrode active material (μm) | Electrolyte solution | | | Mass ratio of (content of fluoroethylene carbonate and/or vinylene carbonate in electrolyte solution)/(sulfur content in negative electrode active material) | 50 cls cycling capacity retention rate (1-50 cycles) |
|---|---|---|---|---|---|---|---|---|---|---|---|---|---|---|---|---|---|
| | | Type | Carbon content in negative electrode active material (mass %) | Thickness (nm) | Type | Sulfur content in negative electrode active material (mass %) | Thickness (nm) | Cladding rate | | | | | Fluoroethylene carbonate content (mass %) | Vinylene carbonate content (mass %) | Mass ratio of fluoroethylene carbonate content/vinylene carbonate content | | |
| Example 1 | Ferrosilicon alloy | Glucose | 2.3% | 30 nm | Elemental sulfur | 1.2% | 23 nm | 92% | 1.92 | 1.24% | 41.96 | 5 μm | 4% | 2% | 2.0 | 5.00 | 80.7% |
| Example 2 | Elemental silicon | Glucose | 2.3% | 30 nm | Elemental sulfur | 1.2% | 23 nm | 92% | 1.92 | 1.24% | 41.96 | 5 μm | 4% | 2% | 2.0 | 5.00 | 66.8% |
| Example 3 | Silicon monoxide | Carbon black | 2.3% | 22 nm | Elemental sulfur | 1.2% | 23 nm | 92% | 1.92 | 1.24% | 41.96 | 5 μm | 4% | 2% | 2.0 | 5.00 | 94.4% |
| Example 4 | Silicon monoxide | Graphene | 2.3% | 25 nm | Elemental sulfur | 1.2% | 23 nm | 92% | 1.92 | 1.24% | 41.96 | 5 μm | 4% | 2% | 2.0 | 5.00 | 96.3% |
| Example 5 | Silicon monoxide | Carbon nanotubes | 2.3% | 25 nm | Elemental sulfur | 1.2% | 23 nm | 92% | 1.92 | 1.24% | 41.96 | 5 μm | 4% | 2% | 2.0 | 5.00 | 96.5% |
| Example 6 | Silicon monoxide | Cellulose | 2.3% | 30 nm | Elemental sulfur | 1.2% | 23 nm | 92% | 1.92 | 1.24% | 41.96 | 5 μm | 4% | 2% | 2.0 | 5.00 | 87.3% |
| Example 7 | Silicon monoxide | Glucose | 1.1% | 12 nm | Elemental sulfur | 1.2% | 23 nm | 92% | 0.92 | 1.23% | 88.82 | 5 μm | 4% | 2% | 2.0 | 5.00 | 91.2% |
| Example 8 | Silicon monoxide | Glucose | 2.3% | 30 nm | Elemental sulfur | 1.2% | 23 nm | 92% | 1.92 | 1.24% | 41.96 | 5 μm | 4% | 2% | 2.0 | 5.00 | 95.7% |
| Example 9 | Silicon monoxide | Glucose | 3.2% | 50 nm | Elemental sulfur | 1.2% | 23 nm | 92% | 2.67 | 1.26% | 29.88 | 5 μm | 4% | 2% | 2.0 | 5.00 | 95.2% |
| Example 10 | Silicon monoxide | Glucose | 4.0% | 78 nm | Elemental sulfur | 1.2% | 23 nm | 92% | 3.33 | 1.27% | 23.70 | 5 μm | 4% | 2% | 2.0 | 5.00 | 92.3% |
| Example 11 | Silicon monoxide | Glucose | 4.9% | 98 nm | Elemental sulfur | 1.2% | 23 nm | 92% | 4.08 | 1.28% | 19.16 | 5 μm | 4% | 2% | 2.0 | 5.00 | 91.4% |
| Example 12 | Silicon monoxide | Glucose | 0.4% | 5 nm | Elemental sulfur | 1.2% | 23 nm | 92% | 0.33 | 1.22% | 246.00 | 5 μm | 4% | 2% | 2.0 | 5.00 | 83.1% |
| Example 13 | Silicon monoxide | Glucose | 6% | 120 nm | Elemental sulfur | 1.2% | 23 nm | 92% | 5.00 | 1.29% | 15.47 | 5 μm | 4% | 2% | 2.0 | 5.00 | 88.7% |
| Example 14 | Silicon monoxide | Glucose | 2.3% | 10 nm | Elemental sulfur | 0.5% | 10 nm | 83% | 4.60 | 0.51% | 42.26 | 5 μm | 4% | 2% | 2.0 | 12.00 | 93.1% |
| Example 15 | Silicon monoxide | Glucose | 2.3% | 10 nm | Elemental sulfur | 2.0% | 32 nm | 98% | 1.15 | 2.09% | 41.61 | 5 μm | 4% | 2% | 2.0 | 3.00 | 95.3% |
| Example 16 | Silicon monoxide | Glucose | 2.3% | 10 nm | Elemental sulfur | 3.00% | 47 nm | 100% | 0.77 | 3.17% | 41.17 | 5 μm | 4% | 2% | 2.0 | 2.00 | 95.0% |

TABLE 3-continued

| | Silicon inner core Type | First cladding layer (Carbon-containing layer) | | | Second cladding layer (Elemental sulfur layer) | | | | Mass ratio of carbon content/sulfur content in negative electrode active material | Mass ratio of sulfur content/silicon inner core content/silicon in negative electrode active material | Mass ratio of silicon inner core content/carbon content in negative electrode active material | Particle size of negative electrode active material (μm) | Electrolyte solution | | | Mass ratio of (content of fluoroethylene carbonate and/or vinylene carbonate in electrolyte solution)/(sulfur content in negative electrode active material) | 50 cls cycling capacity retention rate (1-50 cycles) |
| | | Type | Carbon content in negative electrode active material (mass %) | Thickness (nm) | Type | Sulfur content in negative electrode active material (mass %) | Thickness (nm) | Cladding rate | | | | | Fluoroethylene carbonate content (mass %) | Vinylene carbonate content (mass %) | Mass ratio of fluoroethylene carbonate content/vinylene carbonate content | | |
|---|---|---|---|---|---|---|---|---|---|---|---|---|---|---|---|---|---|
| Example 17 | Silicon monoxide | Glucose | 2.3% | 10 nm | Elemental sulfur | 0.1% | 4 nm | 70% | 23.00 | 0.10% | 42.43 | 5 μm | 4% | 2% | 2.0 | 60.00 | 88.5% |
| Example 18 | Silicon monoxide | Glucose | 2.3% | 10 nm | Elemental sulfur | 4.0% | 70 nm | 100% | 0.58 | 4.27% | 40.74 | 5 μm | 4% | 2% | 2.0 | 1.50 | 85.3% |
| Example 19 | Silicon monoxide | Glucose | 2.3% | 30 nm | Elemental sulfur | 1.2% | 23 nm | 92% | 1.92 | 1.24% | 41.96 | 1 μm | 4% | 2% | 2.0 | 5.00 | 90.1% |
| Example 20 | Silicon monoxide | Glucose | 2.3% | 30 nm | Elemental sulfur | 1.2% | 23 nm | 92% | 1.92 | 1.24% | 41.96 | 2 μm | 4% | 2% | 2.0 | 5.00 | 91.2% |
| Example 21 | Silicon monoxide | Glucose | 2.3% | 30 nm | Elemental sulfur | 1.2% | 23 nm | 92% | 1.92 | 1.24% | 41.96 | 3 μm | 4% | 2% | 2.0 | 5.00 | 92.5% |
| Example 22 | Silicon monoxide | Glucose | 2.3% | 30 nm | Elemental sulfur | 1.2% | 23 nm | 92% | 1.92 | 1.24% | 41.96 | 4 μm | 4% | 2% | 2.0 | 5.00 | 93.4% |
| Example 23 | Silicon monoxide | Glucose | 2.3% | 30 nm | Elemental sulfur | 1.2% | 23 nm | 92% | 1.92 | 1.24% | 41.96 | 6 μm | 4% | 2% | 2.0 | 5.00 | 93.2% |
| Example 24 | Silicon monoxide | Glucose | 2.3% | 30 nm | Elemental sulfur | 1.2% | 23 nm | 92% | 1.92 | 1.24% | 41.96 | 7 μm | 4% | 2% | 2.0 | 5.00 | 92.6% |
| Example 25 | Silicon monoxide | Glucose | 2.3% | 30 nm | Elemental sulfur | 1.2% | 23 nm | 92% | 1.92 | 1.24% | 41.96 | 0.5 μm | 4% | 2% | 2.0 | 5.00 | 83.1% |
| Example 26 | Silicon monoxide | Glucose | 2.3% | 30 nm | Elemental sulfur | 1.2% | 23 nm | 92% | 1.92 | 1.24% | 41.96 | 8 μm | 4% | 2% | 2.0 | 5.00 | 87.2% |
| Example 27 | Silicon monoxide | Glucose | 2.3% | 30 nm | Elemental sulfur | 1.2% | 23 nm | 92% | 1.92 | 1.24% | 41.96 | 5 μm | 2% | 0% | / | 1.67 | 90.3% |
| Example 28 | Silicon monoxide | Glucose | 2.3% | 30 nm | Elemental sulfur | 1.2% | 23 nm | 92% | 1.92 | 1.24% | 41.96 | 5 μm | 4% | 0% | / | 3.33 | 92.3% |
| Example 29 | Silicon monoxide | Glucose | 2.3% | 30 nm | Elemental sulfur | 1.2% | 23 nm | 92% | 1.92 | 1.24% | 41.96 | 5 μm | 6% | 0% | / | 5.00 | 93.8% |
| Example 30 | Silicon monoxide | Glucose | 2.3% | 30 nm | Elemental sulfur | 1.2% | 23 nm | 92% | 1.92 | 1.24% | 41.96 | 5 μm | 8% | 0% | / | 6.67 | 93.1% |
| Example 31 | Silicon monoxide | Glucose | 2.3% | 30 nm | Elemental sulfur | 1.2% | 23 nm | 92% | 1.92 | 1.24% | 41.96 | 5 μm | 10% | 0% | / | 8.33 | 90.7% |
| Example 32 | Silicon monoxide | Glucose | 2.3% | 30 nm | Elemental sulfur | 1.2% | 23 nm | 92% | 1.92 | 1.24% | 41.96 | 5 μm | 0.5% | 0% | / | 0.42 | 83.2% |
| Example 33 | Silicon monoxide | Glucose | 2.3% | 30 nm | Elemental sulfur | 1.2% | 23 nm | 92% | 1.92 | 1.24% | 41.96 | 5 μm | 11% | 0% | / | 9.17 | 88.9% |

TABLE 3-continued

| | Silicon inner core Type | First cladding layer (Carbon-containing layer) Type | First cladding: Carbon content in negative electrode active material (mass %) | First cladding Thickness (nm) | Second cladding layer (Elemental sulfur layer) Type | Second cladding: Sulfur content in negative electrode active material (mass %) | Second cladding Thickness (nm) | Cladding rate | Mass ratio of carbon content/sulfur content in negative electrode active material | Mass ratio of sulfur content/silicon inner core content in negative electrode active material | Mass ratio of silicon inner core content/carbon content in negative electrode active material | Particle size of negative electrode active material (μm) | Electrolyte solution: Fluoroethylene carbonate content (mass %) | Vinylene carbonate content (mass %) | Mass ratio of fluoroethylene carbonate content/vinylene carbonate content | Mass ratio of (content of fluoroethylene carbonate and/or vinylene carbonate in electrolyte solution)/(sulfur content in negative electrode active material) | 50 cls cycling capacity retention rate (1-50 cycles) |
|---|---|---|---|---|---|---|---|---|---|---|---|---|---|---|---|---|---|
| Example 34 | Silicon monoxide | Glucose | 2.3% | 30 nm | Elemental sulfur | 1.2% | 23 nm | 92% | 1.92 | 1.24% | 41.96 | 5 μm | 0.5% | 0.5% | 1.0 | 0.83 | 90.0% |
| Example 35 | Silicon monoxide | Glucose | 2.3% | 30 nm | Elemental sulfur | 1.2% | 23 nm | 92% | 1.92 | 1.24% | 41.96 | 5 μm | 1.0% | 1.0% | 1.0 | 1.67 | 90.6% |
| Example 36 | Silicon monoxide | Glucose | 2.3% | 30 nm | Elemental sulfur | 1.2% | 23 nm | 92% | 1.92 | 1.24% | 41.96 | 5 μm | 1% | 2% | 0.5 | 2.50 | 91.3% |
| Example 37 | Silicon monoxide | Glucose | 2.3% | 30 nm | Elemental sulfur | 1.2% | 23 nm | 92% | 1.92 | 1.24% | 41.96 | 5 μm | 2% | 2% | 1.0 | 3.33 | 91.9% |
| Example 38 | Silicon monoxide | Glucose | 2.3% | 30 nm | Elemental sulfur | 1.2% | 23 nm | 92% | 1.92 | 1.24% | 41.96 | 5 μm | 3% | 2% | 1.5 | 4.17 | 92.6% |
| Example 39 | Silicon monoxide | Glucose | 2.3% | 30 nm | Elemental sulfur | 1.2% | 23 nm | 92% | 1.92 | 1.24% | 41.96 | 5 μm | 5% | 2% | 2.5 | 5.83 | 94.7% |
| Example 40 | Silicon monoxide | Glucose | 2.3% | 30 nm | Elemental sulfur | 1.2% | 23 nm | 92% | 1.92 | 1.24% | 41.96 | 5 μm | 6% | 2% | 3.0 | 6.67 | 94.3% |
| Example 41 | Silicon monoxide | Glucose | 2.3% | 30 nm | Elemental sulfur | 1.2% | 23 nm | 92% | 1.92 | 1.24% | 41.96 | 5 μm | 7% | 2% | 3.5 | 7.50 | 94.0% |
| Example 42 | Silicon monoxide | Glucose | 2.3% | 30 nm | Elemental sulfur | 1.2% | 23 nm | 92% | 1.92 | 1.24% | 41.96 | 5 μm | 8% | 2% | 4.0 | 8.33 | 93.6% |
| Example 43 | Silicon monoxide | Glucose | 2.3% | 30 nm | Elemental sulfur | 1.2% | 23 nm | 92% | 1.92 | 1.24% | 41.96 | 5 μm | 0.2% | 0.6% | 0.3 | 0.67 | 82.1% |
| Example 44 | Silicon monoxide | Glucose | 2.3% | 30 nm | Elemental sulfur | 1.2% | 23 nm | 92% | 1.92 | 1.24% | 41.96 | 5 μm | 11% | 2.0% | 5.5 | 10.83 | 86.6% |
| Comparative Example 1 | Silicon monoxide | Glucose | 2.3% | 30 nm | / | / | 23 nm | / | / | / | / | / | / | / | / | / | / |
| Comparative Example 2 | Silicon monoxide | Glucose | 2.3% | 30 nm | Carbon-based material | 1.2% | 23 nm | / | / | / | / | / | / | / | / | / | / |

It can be seen from the above table 3 that:

It can be seen from Examples 1 to 2 that in the negative electrode active material of the present application, the silicon inner core is selected from one or more of elemental silicon, silicon alloys and silicon oxides, which can achieve the effect of improving the energy density of the secondary battery and prolonging the cycle life.

It can be seen from Examples 3 to 6 that in the negative electrode active material of the present application, the carbon source material as the first cladding layer is selected from one or more of glucose, sucrose, starch, phenolic resin, polyacrylonitrile, polyimide, polyvinylidene fluoride, carbon black, carbon nanotubes and graphene, which can achieve the effect of improving the energy density of the secondary battery and prolonging the cycle life.

As can be seen from Examples 7 to 13 that in the negative electrode active material of the present application, the carbon content in the negative electrode active material is further set within a specific range, and the thickness of the first cladding layer is correspondingly set within a specific range, which can achieve the effect of improving the energy density of the secondary battery and prolonging the cycle life.

As can be seen from Examples 14 to 18 that in the negative electrode active material of the present application, the sulfur content in the negative electrode active material is further set within a specific range, and the thickness of the second cladding layer is correspondingly set within a specific range, which can achieve the effect of improving the energy density of the secondary battery and prolonging the cycle life.

As can be seen from Examples 19 to 26 that in the negative electrode active material of the present application, the particle size of the negative electrode active material is further set within a specific range, which can achieve the effect of improving the energy density of the secondary battery and prolonging the cycle life.

As can be seen from Examples 27 to 33 that, when the negative electrode active material of the present invention and an electrolyte solution are made into a secondary battery, the content of fluoroethylene carbonate as a specific additive in the electrolyte solution is further set within a specific range, which can achieve the effect of improving the energy density of the secondary battery and prolonging the cycle life.

As can be seen from Examples 34 to 44 that, when the negative electrode active material of the present invention and an electrolyte solution are made into a secondary battery, the total content of fluoroethylene carbonate and vinylene carbonate as specific additives in the electrolyte solution and the mass ratio of the total content to the sulfur content in the negative electrode active material are set within specific ranges, which can achieve the effect of improving the energy density of the secondary battery and prolonging the cycle life.

From the comparison of the above-mentioned Examples 1 to 44 and Comparative Examples 1 to 2, it can be seen that the negative electrode active material in Comparative Example 1 lacks the elemental sulfur cladding layer; and the negative electrode active material in Comparative Example 2 uses a carbon-based material instead of elemental sulfur in the second cladding layer, so that compared with other examples in Table 3, Comparative Example 1 and Comparative Example 2 have poor cycling performance.

It should be noted that the present application is not limited to the embodiments above. The above embodiments are merely exemplary, and embodiments having substantially the same technical idea and the same effects within the scope of the technical solutions of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

The invention claimed is:

1. A negative electrode active material, comprising:
a silicon inner core comprising silicon monoxide;
a first cladding layer clad on a surface of the silicon inner core, wherein the first cladding layer comprises carbon resulting from heating a carbon source material comprising glucose; and
a second cladding layer clad on a surface of the first cladding layer, wherein the second cladding layer is an elemental sulfur layer comprising elemental sulfur,
wherein the second cladding layer has a coverage ratio of 70% to 100%,
a sulfur content of the elemental sulfur in the second cladding layer is 0.5 mass % to 3 mass %, based on a total mass of the negative electrode active material,
a carbon content of the carbon in the first cladding layer is 1.1 mass % to 4.9 mass %, based on a total mass of the negative electrode active material,
the second cladding layer has a thickness of 10 nm to 47 nm, the first cladding layer has a thickness of 12 nm to 98 nm, and the negative electrode active material has a particle size of 1 μm to 7 μm.

2. The negative electrode active material according to claim 1, wherein,
the sulfur content is 1.2 mass % to 3 mass % based on a total mass of the negative electrode active material.

3. The negative electrode active material according to claim 1, wherein,
the carbon content in the first cladding layer is 2.3 mass % to 4.9 mass % based on a total mass of the negative electrode active material.

4. The negative electrode active material according to claim 1, wherein,
a mass ratio of the carbon content to the sulfur content is 0.33 to 23 in the negative electrode active material.

5. The negative electrode active material according to claim 1, wherein,
a mass ratio of the elemental sulfur to the silicon inner core is 0.10% to 4.27% in the negative electrode active material.

6. The negative electrode active material according to claim 1, wherein,
a mass ratio of the silicon inner core to the carbon is 15.47 to 246 in the negative electrode active material.

7. The negative electrode active material according to claim 1, wherein,
the silicon inner core further comprises silicon alloy, the silicon alloy is one or more selected from ferrosilicon alloy, silicon-aluminum alloy, silicomanganese alloy, silicon-tin alloy, and silicon-germanium alloy.

8. The negative electrode active material according to claim 1, wherein,
the second cladding layer has a thickness of 4 nm to 70 nm, the first cladding layer has a thickness of 5 nm to 120 nm, and the negative electrode active material has a particle size of 0.5 μm to 8 μm.

9. A secondary battery comprising the negative electrode active material of claim 1 and an electrolyte solution, wherein the electrolyte solution comprises fluoroethylene carbonate, a content of the fluoroethylene carbonate is 2 mass % to 10 mass %.

10. The secondary battery according to claim 9, wherein, the electrolyte solution further comprises vinylene carbonate, a content of the vinylene carbonate is 0.5 mass % to 2 mass %.

11. The secondary battery according to claim 9, wherein, a mass ratio of a content of fluoroethylene carbonate in the electrolyte solution to a sulfur content in the negative electrode active material is 0.42 to 60.

12. The secondary battery according to claim 10, wherein, a ratio of the content of the fluoroethylene carbonate to the content of the vinylene carbonate is 0.3 to 5.5 in the electrolyte solution.

13. A battery module comprising the secondary battery according to claim 9.

14. A battery pack comprising the battery module according to claim 13.

15. An electrical apparatus comprising the secondary battery according to claim 9.

* * * * *